Figure 1:
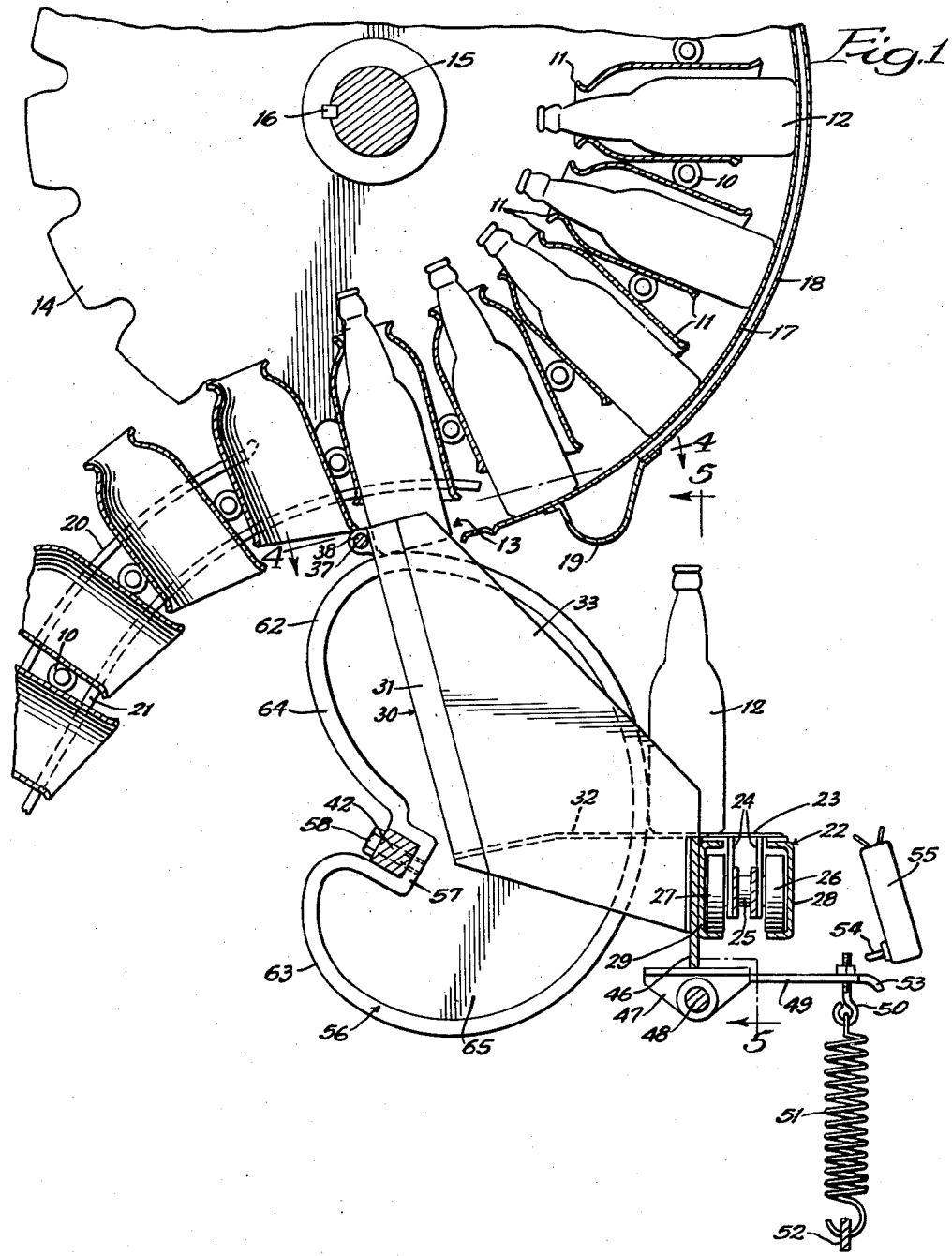

Nov. 4, 1958  M. VAMVAKAS  2,858,929
BOTTLE DISCHARGER
Filed Sept. 23, 1955  3 Sheets-Sheet 2

INVENTOR:
Michael Vamvakas,
BY
Dawson, Tilton & Graham
ATTORNEYS.

Nov. 4, 1958
M. VAMVAKAS
2,858,929
BOTTLE DISCHARGER
Filed Sept. 23, 1955
3 Sheets-Sheet 3
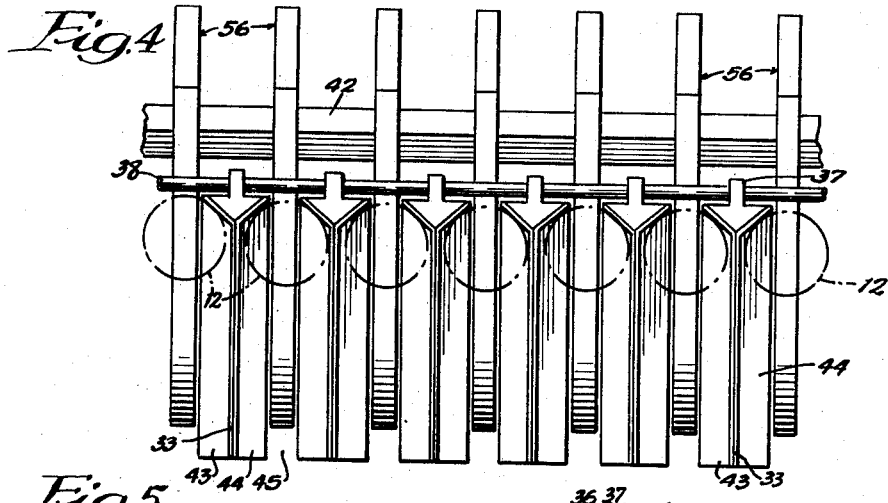
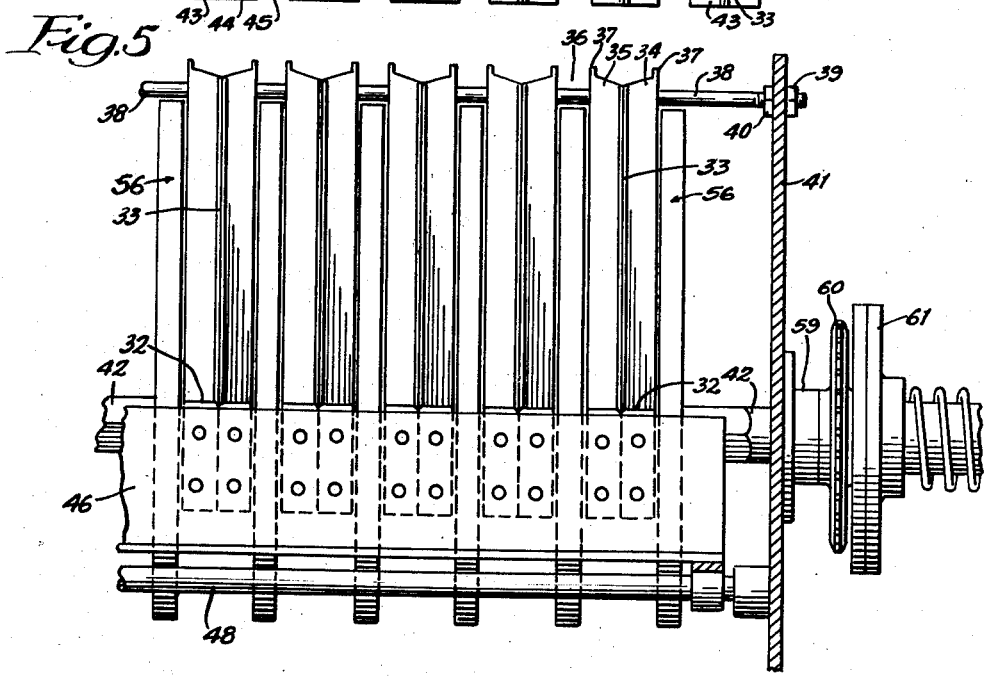
INVENTOR:
Michael Vamvakas,
BY
Dawson, Tilton & Graham,
ATTORNEYS.

United States Patent Office 2,858,929
Patented Nov. 4, 1958

2,858,929

BOTTLE DISCHARGER

Michael Vamvakas, Maywood, Ill., assignor, by mesne assignments, to Barry-Wehmiller Machinery Company, St. Louis, Mo.

Application September 23, 1955, Serial No. 536,143

5 Claims. (Cl. 198—25)

This invention relates to a discharge mechanism, and more especially to a mechanism useful in discharging bottles from bottle-conditioning apparatus such as a bottle washer.

In bottle washers and similar bottle conditioning apparatus, bottles are loaded into pockets provided by an endless bottle carrier. The pockets are oriented in adjacent relation, and the carrier in its path of travel moves the pockets and the bottles received therein through various stations in the washer. Generally, the carriers are arranged in banks, such as eight or sixteen etc. in width, so that a plurality of bottles are all loaded simultaneously into pockets at the inlet end of the apparatus and are moved in aligned relation therethrough.

After the bottles have been moved through all of the stages in the washer, they are discharged therefrom, ordinarily onto a conveyor that carries the cleaned and sterilized bottles to filling stations, and after the filling thereof to cappers and then to a station where the filled and capped bottles are placed in cases for shipment and storage. The apparatus is for the most part automatic, and bottles are fed into the carrier pockets by automatic mechanism and are released from the pockets by automatic mechanism at the discharge end of the washer.

A number of different bottle discharge mechanisms have been developed for removing bottles from the carrier pockets and for feeding them onto the discharge conveyor. Known apparatus is quite complex, requiring an enormous number of parts—one reason for this being that the discharging mechanism is of a reciprocating nature which also often limits the speed of operation. Furthermore, reciprocating mechanisms frequently cause bottle breakage and usually are quite rough on the bottles, marring and scratching the surfaces thereof.

There is a need for an improved bottle discharging apparatus which will overcome these disadvantages and it is, accordingly, an object of this invention to provide such an improved bottle discharger. Another object of the invention is in the provision of a bottle discharger that operates continuously and that permits the bottle carriers to move continuously through the bottle washer rather than in a step-by-step manner. Still another object is in providing bottle discharge apparatus adapted for use in conjunction with bottle washers and the like, wherein reciprocatory movements are eliminated, and in which bottles are discharged rapidly yet smoothly and gently whereby bottle breakage and other damage thereto are substantially minimized.

Yet another object is to provide a bottle discharge cam that is operative to lower bottles from the carrier pockets onto a receiving platform and to also move those bottles across the platform and onto a discharge conveyor—the single cam providing both of these results. A further object is that of providing in apparatus of the character described, a discharge cam having a portion adapted to receive bottles thereon and lower them from the carrier pockets and onto a platform, and a pusher section for engaging bottles on the platform to move them thereacross and onto a discharge conveyor.

Still a further object is in providing a bottle discharger adapted for use with endless bottle carriers providing a plurality of adjacent carrier pockets, the apparatus comprising a guide having an upwardly extending portion adapted to pass a bottle downwardly therethrough and a platform portion adapted to receive bottles thereon and to have the same moved thereacross—the guide assembly being supported for pivotal movement and arranged with a safety device, whereby if a bottle becomes lodged in a carrier pocket, the guide assembly will pivot in the direction of movement of the carrier and actuate a safety device to shut down the entire apparatus. Yet a further object is in the provision of a cam and guide assembly of the character described, the cam being supported for rotation and being movable through both the upwardly extending guide section and platform section to control and effectuate the discharge of bottles from the bottle carrier. Additional objects and advantages will become apparent as the specification is developed.

An illustrative embodiment of the invention in an environmental setting is shown in the accompanying drawings, in which—

Figure 2:
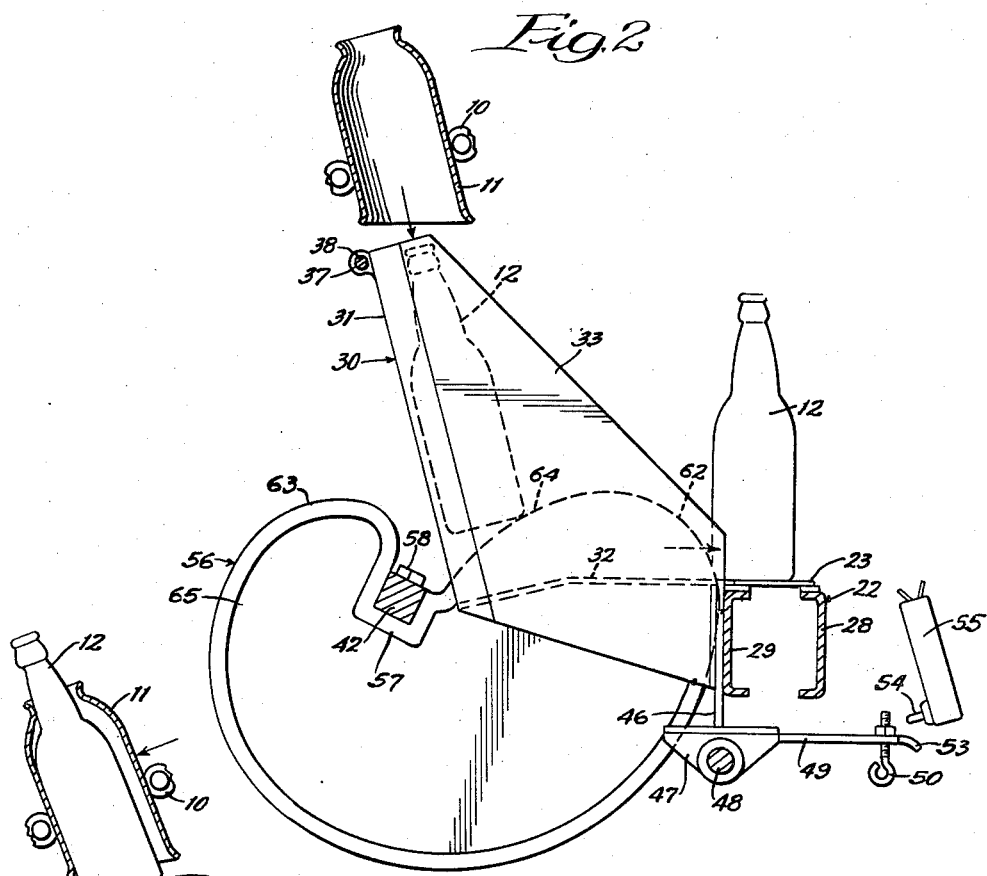
Figure 3:
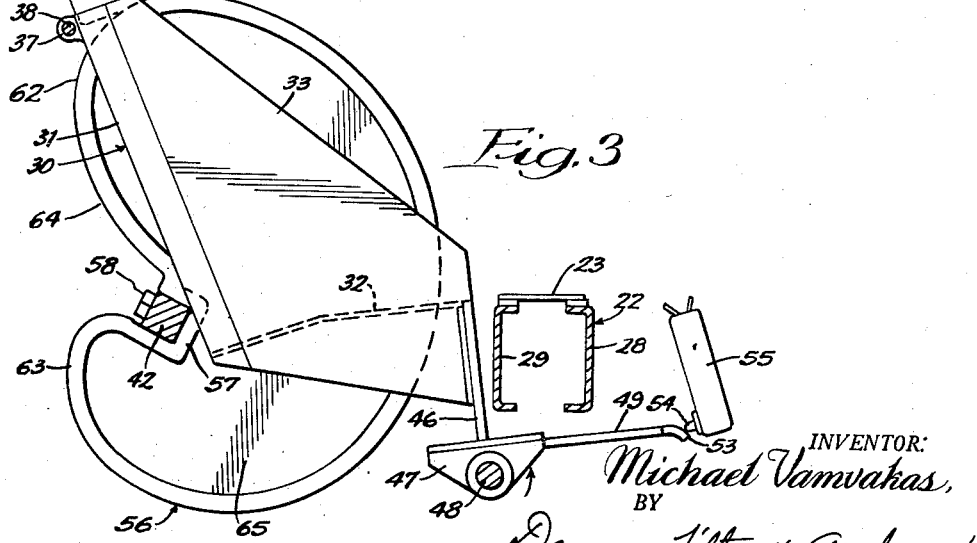

Figure 1 is a side view, partly in elevation and partly in section, showing the inventive apparatus in use with a bottle carrier; Figure 2 is a side view similar to that of Figure 1, but with the bottle carrier removed to show the discharge cam in another of its operative positions; Figure 3 is a side view similar to that of Figure 2, but showing the guide assembly in its moved position which may be brought about by a locking of a bottle in a bottle carrier pocket; Figure 4 is a broken longitudinal sectional view taken along the line 4—4 of Figure 1; and Figure 5 is a broken vertical sectional view taken along the line 5—5 of Figure 1.

The bottle discharging mechanism may be employed in conjunction with various forms of bottle conditioning devices; but for purposes of illustration and for purposes of describing the invention in an environmental setting, Figure 1 shows the discharger in use with a typical bottle washer. The portions of the bottle washer illustrated include an endless carrier designated by the numeral 10, comprising a plurality of bottle receiving and carrying pockets 11 adapted to receive bottles 12 therein. The pockets 11 are arranged in tandem relation along the carrier 10, and are adapted to advance the bottles one-by-one into a discharge station designated generally with the numeral 13.

In effect, the carrier 10 comprises a plurality of links generally similar to a link chain, and it is entrained about a drive pulley or wheel 14 mounted upon a shaft 15 by means of a key 16 that prevents relative rotational movement between the wheel and shaft. The shaft 15 is adapted to be rotatably driven by appropriate drive mechanism which is well known, and for that reason not shown.

In their advance to the discharge station 13, at which time the pockets 11 are inverted so that bottles may drop therefrom due to their own weight, the bottles slide over and are held within the pockets by an arcuate guard 17 that subscribes an arc substantially coaxial with the wheel 14. If desired, a shield 18 may be provided along the outer surface of the guard 17, and it may be equipped with a trough 19 adapted to receive liquid that drains from the pockets 11 and bottles 12 therein. The portion of the guard 17 above the trough 19 may be perforated to permit liquid to drain downwardly therethrough. The guard 17 terminates adjacent the discharge station 13 so that bottles when moved into that station are unsupported by the guard.

Guide rails 20 and 21 may extend along the path of travel of the carrier 10 and, as will be appreciated, the carrier in its path of travel beyond the discharge station 13 advances the pockets 11 to the infeed end of the bottle washer where other bottles are fed thereinto and are advanced by the carrier through the various stations of the bottle washer.

Spaced below, and laterally or rearwardly of, the discharge station 13 is a receiver designated generally with the numeral 22, and in the illustration given is in the form of a conveyor adapted to have bottles moved thereonto and to carry those bottles to further stations in a bottle handling line—as, for example, the bottle filling and capping stations. The receiver 22 comprises an endless conveyor belt 23 carried by the support member 24 mounted upon a shaft 25 equipped with wheels 26 and 27 that ride within the respective tracks 28 and 29. As the wheels run along the track members, which are generally U-shaped, the conveyor belt 23 is advanced. The conveyor may be wholly conventional, and since conveyors of the character here employed are well known in the art, a further description thereof will not be set forth.

Extending between the discharge station 13 and receiver 22 is a guide assembly indicated generally by the numeral 30. The guide assembly comprises an upwardly extending guide section 31, a generally horizontal platform section 32, and guide walls 33 that extend toward the receiver 22. As has been brought out herein before, bottle conditioning apparatus normally provides a bank of bottle carriers, and similarly then the discharge mechanism must provide a bank of bottle dischargers. This is apparent from an examination of Figures 4 and 5 which show a plurality of individual dischargers arranged in side-by-side relation to define a bank.

Referring now to Figure 5 in particular, it is seen that the generally vertical guide sections 31 each comprise a pair of inclined walls 34 and 35 that define a generally V-shaped channel adapted to have a bottle passed therethrough. The walls 34 and 35, which together define a single guide section 31, are spaced apart to provide a slot 36 extending longitudinally therebetween for a purpose to be described in detail hereinafter. The adjacent guide walls 34 and 35—that is, those guide walls that define portions of adjacent guide sections 31—are connected at their contiguous edges to the laterally extending walls 33.

The walls 34 and 35 each are provided with a forwardly extending ear 37 that passes therethrough an elongated rod 38 secured at its ends by means of nuts 39 and 40 to a support plate 41 pivotally carried on a drive shaft 42. Thus, by means of the rod 38, the upper ends of the guide walls 34 and 35 are unified. The lower ends of the walls 34 and 35 are rigidly secured to the platform sections 32. As shown in Figure 4, each platform section comprises a pair of platform elements 43 and 44 that are spaced apart to define a slot 45 therebetween. The elements 43 and 44 are adapted to support bottles thereon, as is indicated in Figure 4 by the dotted lines which represent bottles 12. The walls 43 and 44 of adjacent platform sections are secured to the rearwardly extending walls 33 heretofore described.

The platform sections 32 and walls 33 are rigidly secured to a support plate 46, that in turn is rigidly carried by bearing supports 47 journaled for rotational movement about a support shaft 48 extending longitudinally along the receiver 22 a spaced distance therebelow. The support bearings 47 and guide assembly 30 carried thereby are adapted to rotate in a counter-clockwise direction about the support shaft 48, as viewed in Figure 1. To prevent free pivotal movement thereof, and to bias the guide assembly into the position shown in Figure 1, the bearing supports 47 are equipped with a rearwardly extending arm 49 provided with a depending eyebolt 50 that provides a mounting for one end of a coil spring 51 secured at its opposite end to a fixed bracket 52. The arm 49 at its rear end has a downwardly turned tip 53 adapted to strike and depress the actuating lever 54 of a safety switch 55 which is connected in the electric power circuit for energizing the motor or motors that provide power for the driven shafts, etc. of the bottle washer and of the bottle discharge mechanisms. The arrangement is such that when the lever 54 is depressed, the safety switch 55 interrupts the power circuits and stops operation of the apparatus.

Associated with each of the guide assemblies 30 is a discharging cam 56, each of which is provided with a polygonal (preferably square) mounting section 57 secured to the drive shaft 42 that corresponds in shape by means of a cap screw 58. As is shown most clearly in Figure 5, the shaft 42 is adapted to be rotatably driven, and at one end thereof may be journaled for rotation in a bearing 59. Adjacent the bearing 59 is a drive sprocket wheel 60 mounted upon the shaft 42 and arranged to drive the same through a friction clutch 61 that is of such character that when free rotational movement of the shaft 42 is impaired, the clutch permits the shaft to remain stationary even though the drive sprocket 60 may continue to be rotated by the sprocket chain and drive means connected therewith, neither of which are shown. Switch clutches or friction clutches of this type are well known in that art, and for that reason need not be described in greater detail. For a more elaborate discussion of such a drive, reference may be made to my copending patent application, Serial No. 291,256, filed June 2, 1952, now Patent No. 2,738,866.

As is apparent from the drawings, the cam 56 has an unusual configuration that is somewhat difficult to describe accurately. The cam actually comprises two functional sections, one designated with the numeral 62 which may be referred to as the elevator or lowering section, and the other designated with the numeral 63 which may be referred to as the pusher section. To provide a word picture of the cam's configuration, the section 62 may be thought of as corresponding to a parabolic spiral since it is quite similar in shape thereto, while the pusher section 63 has the general shape of the spiral of Archimedes. It should be emphasized, however, that these cam sections do not correspond accurately with the mathematical formulae for those specific spirals. It should also be brought out that the specific configuration may be varied somewhat to accommodate the particular characteristics of the bottle conditioning apparatus with which the discharger is employed. For example, the curvature of the segment 64 of the cam section 62 may be made sharper or straighter if it is desired to lower a bottle onto the platform 32 at a more rapid rate, while the curvature may be increased or made more gradual if it is desired to decrease the rate at which bottles are lowered from the carrier pockets 11 onto the platform 32. Each of the cams 56 may be formed of metal or plastic or other material, and they may be solid members or perimetric cam members, as shown, wherein the interiors 65 thereof are removed to decrease the cam weight.

*Operation*

In operation of the discharge apparatus, the rate of travel of the carriers 10 is timed with the rotational movement of the cam members 56 so that a carrier pocket 11 is aligned with the discharge station 13, as shown in Figure 1, when the lowering section 62 of the cam is upwardly oriented and adjacent that station, also as is shown in Figure 1. The carrier 10 may move continuously, and preferably the cam members 56 are rotated continuously. The discharge conveyor preferably will provide continuous movement of the conveyor belt 23.

Continued movement of the carrier advances the pocket 11 having a bottle therein into the discharge station 13, and since the guard 17 terminates adjacent that station, the bottle is free to move downwardly and out of the carrier pocket. The cam having a lowering section thereof positioned beneath the pocket at that time receives the bottle thereon, and as it continues to rotate in a clockwise direction permits the bottle to slide downwardly through the guide 31, as shown in Figure 2, and ultimately onto the platform 32 as the lowering section of the cam moves downwardly through the platform. Thereafter, the pusher section 63 of the cam nudges the bottle along the platform and ultimately pushes it onto the conveyor belt 23 that carries it away from adjacent the cam.

It will be noted both in Figures 1 and 3 that the lower end of the bottle moves into a guide and against the rear wall thereof. The guide then is somewhat in the nature of a stop member that limits continued movement of a bottle along the path of travel of the carrier. The guide members then serve as a positive guide to determine the lateral or horizontal positions of a bottle, while the cam determines the vertical positioning thereof. The bottle cannot move downwardly and out of a carrier pocket until such downward movement is permitted by the cam member. Preferably, the upwardly oriented section of the guide is angled slightly, while the adjacent portion of the platform 32 is angled downwardly so that there is no tendency for a bottle to tip toward the conveyor mechanism during the lowering of a bottle and during its positioning upon the platform.

Occasionally in apparatus of this type, bottles will become lodged in a carrier pocket. The apparatus is equipped with a safety feature that, if this occurs, prevents damage to the bottles, carrier pockets and the apparatus generally. The safety arrangement involves a pivotal support for the guide members, and permits the same to be pivoted in a counter-clockwise direction, as is shown in Figure 3. Such pivotal movement of the guide members brings the lever arm 49 upwardly and against the actuating plunger 54 of the switch 55. When the switch is actuated, the apparatus is shut down, thus permitting a workman to release the lodged bottle from the carrier pocket and thereafter to restart the apparatus.

A further safety feature is incorporated into the apparatus in the form of the friction clutch 61. The shaft 42 driving the cam members 56 is rotated through the friction clutch 61. Thus, if rotation of the cam members is interrupted, the clutch 61 permits the shaft 42 to remain stationary even though the drive motor for the shaft continued to provide power to the friction drive clutch. If desired, switch arrangements may be combined with the friction clutch to de-energize the driving motor therefor when the clutch is in a slipped condition.

It is to be noted in Figure 1 that each of the cam members 56 is secured to the drive shaft 42 by means of a cap screw that extends through the shaft and is threadedly received within a suitable aperture provided in the cam members. Also, each cam encloses the drive shaft on only three sides thereof, the fourth side of the shaft being open, receiving the head of the cap screw. Thus, it is a simple matter to remove a cam from the drive shaft without disassembling the entire discharger, for the cap screw holding the cam on is easily removed and the cam withdrawn outwardly from the shaft. This feature considerably simplifies repair and replacement of the cam members.

The specific cam configurations can be varied somewhat to fit the requirements in any specific installation, and if it is desired to permit a bottle to move downwardly through the guide more quickly, the segment 64 of the cam can be made sharper and more nearly approximate a straight line. On the other hand, lengthening the curve of this segment will bring about the result of lowering bottles through the guide at a slower rate of movement. In any event, the cam controls the discharge of bottles from the carrier pockets, and permits the bottles to move without damage thereto downwardly and into a standing position upon the platform members. A single cam, then, controls the discharge of bottles from the carrier pockets, provides the lowering arrangement for transferring bottles from a carrier pocket to a receive platform, and thereafter moves the bottles from the platform and onto a discharge conveyor.

While in the foregoing specification an embodiment of the invention has been described in considerable detail for purposes of adequately describing the invention in an environmental setting, it will be apparent to those skilled in the art that numerous changes may be made in those details without departing from the spirit and principles of the invention.

I claim:

1. In a bottle discharger, a guide adapted to have bottles pass therethrough, a platform communicating with said guide for receiving bottles therefrom, said platform being adapted to have bottles moved thereover, means for moving bottles one by one into said guide, a cam having a bottle supporting and lowering section providing a smoothly curved surface for slidably engaging and guiding bottles through said guide and onto said platform as said cam is rotated, said cam having a pusher section for engaging bottles positioned on said platform to move the same thereover, and means for rotating said cam.

2. In combination with a bottle carrier equipped with a plurality of bottle receiving pockets adapted to be advanced one by one into a discharge station, a cam mounted for rotational movement in alignment with the discharge station, means for rotating said cam in timed relation with the movement of said carrier, said cam having a continuously curved lowering section adapted to slidably support the bottoms of bottles moved into the discharge station and to lower the same, and a receiver adapted to have bottles positioned thereon by the curved lowering section of said cam, said cam having also a pusher section adapted to move bottles over the receiver.

3. The apparatus of claim 2 in which said lowering section is elongated and has generally the configuration of a parabolic spiral, and in which said pusher section has generally the configuration of a spiral of Archimedes.

4. In combination with a bottle carrier having a plurality of pockets adapted to receive bottles therein and advance the same one by one into a bottle discharge station, a guide assembly having an inlet end adjacent the discharge station and being adapted to receive bottles therein and pass the same therethrough, means for supporting said guide assembly for pivotal movement along the path of travel of said carrier, means biasing said guide assembly in a position for receiving bottles from the carrier pockets, said guide assembly comprising a generally vertically oriented guide section provided with a longitudinal slot therein and a generally horizontal platform section extending laterally therefrom, a discharge cam mounted for rotation in said slot for controlling the movement of bottles through said vertically oriented guide section and for pushing bottles over said platform, and safety switch means arranged with said guide assembly for actuation upon pivotal movement thereof in the direction of travel of said carrier.

5. In bottle handling equipment, an endless bottle carrier equipped with a plurality of pockets adapted to receive bottles therein, a discharge station provided by said apparatus, means for moving said carrier to advance said pockets one by one into said discharge station, said pockets, when advanced into the discharge station, being oriented to release bottles therefrom, a receiver spaced below and laterally of said discharge station, a platform extending between said receiver and a position below said discharge station, a guide section extending upwardly from said platform and to said discharge station, a discharge cam mounted for rotational movement and being equipped with a plurality of sections, one of which is adapted to control the movement of bottles from the carrier pockets downwardly through said guide section and another of which is adapted to advance bottles across said platform, said guide section and platform being provided with slots therethrough and in which said discharge cam is supported for rotational movement through said slots, said guide section and platform being secured together and said platform being supported for pivotal movement along the path of travel of said carrier, and means for biasing said platform into a predetermined position wherein said guide station is aligned with said discharge station.

References Cited in the file of this patent

UNITED STATES PATENTS

| | | |
|---|---|---|
| 2,358,413 | Monaco | Sept. 19, 1944 |
| 2,371,140 | Alling et al. | Mar. 13, 1945 |